(12) United States Patent
Maruyama

(10) Patent No.: US 8,492,949 B2
(45) Date of Patent: Jul. 23, 2013

(54) ELECTRIC MOTOR

(75) Inventor: Nobuchika Maruyama, Nagano (JP)

(73) Assignee: Shinano Kenshi Kabushiki Kaisha, Ueda-shi, Nagano (JP)

(*) Notice: Subject to any disclaimer, the term of this patent is extended or adjusted under 35 U.S.C. 154(b) by 400 days.

(21) Appl. No.: 12/979,609

(22) Filed: Dec. 28, 2010

(65) Prior Publication Data

US 2011/0193444 A1 Aug. 11, 2011

(30) Foreign Application Priority Data

Feb. 8, 2010 (JP) ................. 2010-025040

(51) Int. Cl.
*H02K 3/34* (2006.01)
*H02K 3/18* (2006.01)

(52) U.S. Cl.
USPC ........................................... 310/194; 310/198

(58) Field of Classification Search
USPC ........................................ 310/194
See application file for complete search history.

(56) References Cited

U.S. PATENT DOCUMENTS

| 7,649,295 B2 * | 1/2010 | Fukui et al. ............ 310/215 |
| 8,013,490 B2 * | 9/2011 | Hino et al. ............. 310/194 |
| 2010/0013344 A1 * | 1/2010 | Fujii .................... 310/215 |

FOREIGN PATENT DOCUMENTS

| JP | 2007-089346 A | 4/2007 |
| JP | 2007-221882 A | 8/2007 |
| JP | 2009-278848 | * 11/2009 |

* cited by examiner

*Primary Examiner* — Burton Mullins
(74) *Attorney, Agent, or Firm* — Westerman, Hattori, Daniels & Adrian, LLP

(57) ABSTRACT

The electric motor of the present invention is capable of improving efficiency of level-winding coil cables and increasing lamination factors of coils. The coil cable, which is wound on first bobbins as first coils, has connection parts. The connection parts are respectively extended from a winding-start point of the first coil wound on each of the first bobbins and a winding-termination point thereof, for parallel winding, through a groove section located on the inner side of a second coil wound on each of second bobbins so as not to interfere with the second coil.

5 Claims, 4 Drawing Sheets

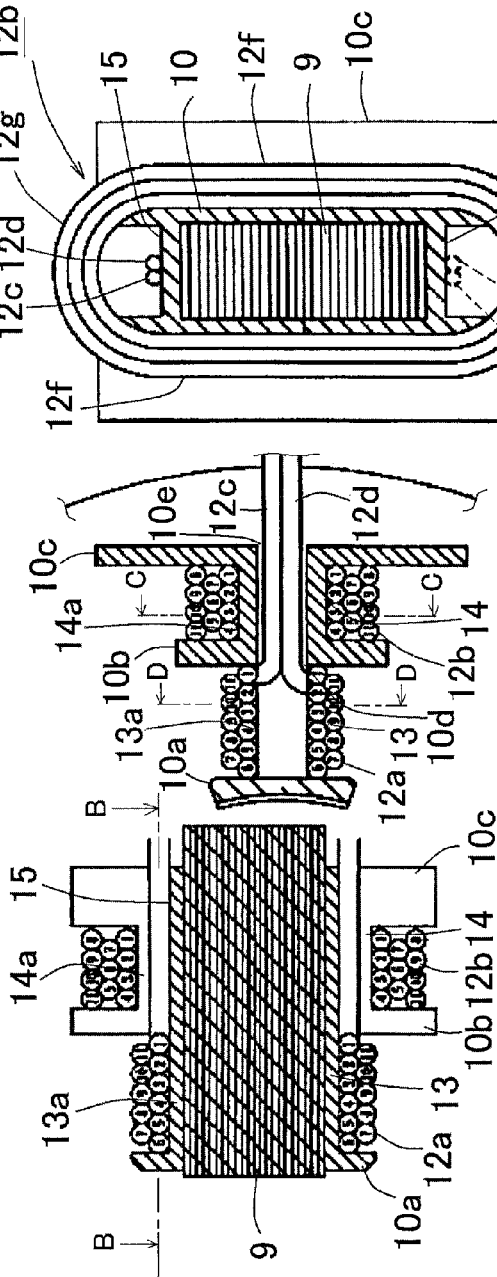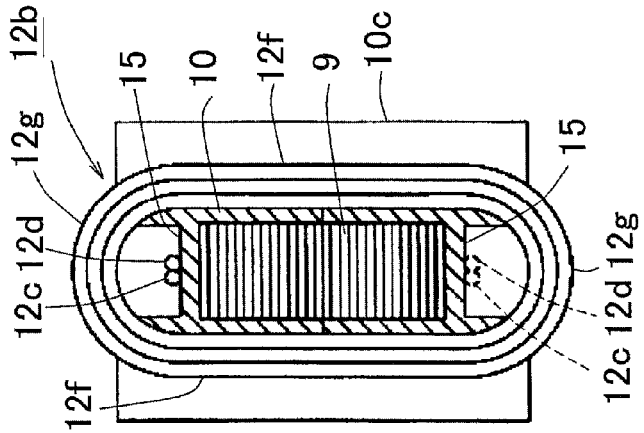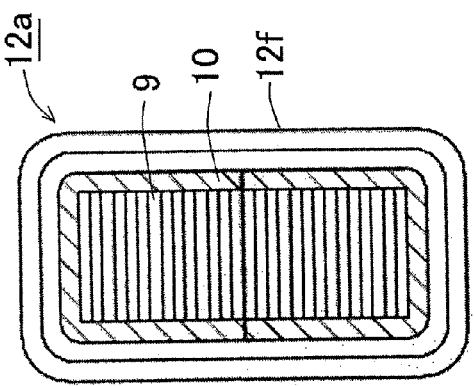

ELECTRIC MOTOR

CROSS-REFERENCE TO RELATED APPLICATION

This application is based upon and claims the benefit of priority of the prior Japanese Patent Application No. P2010-025040, filed on Feb. 8, 2010, and the entire contents of which are incorporated herein by reference.

FIELD

The present invention relates to an electric motor.

BACKGROUND

Each of electric motors has a rotor and a stator. The stator has a stator core, in which motor coils are respectively wound on tooth sections covered with an insulator.

An electric motor for driving a vehicle, for example, is driven by low voltage and high current. Thus, thick cables whose diameter is, for example, 0.8 mm or more, are used as coil cables. In case of winding the thick cable on a tooth section, the cable is wound from a base part of the tooth section (an inner part of a slot) and lap-wound thereon. Then, the cable extended from an end of the coil is transferred to the next tooth section.

To form a level-wound motor coil, a winding-start point of a coil cable is set in a groove section, which is formed on a tooth section and extended from a base part of the tooth section to a front end part thereof, and wound on the tooth section. The cable is lap-wound from the front end part, and a winding-termination point of the cable is transferred from a middle part and wound on the next tooth section (see Japanese Laid-open Patent Publication No. P2007-221882A).

In another conventional example, a coil bobbin has a coil insertion groove, which is extended from an outermost part to an innermost part. A winding-start point of a coil cable is set in the coil insertion groove, a first layer of a coil cable is wound from the innermost part to the outermost part, a second layer of the coil cable is lap-wound from the outermost part to the innermost part, and a transfer cable is located on the outer side (see Japanese Laid-open Patent Publication No. P2007-89346A).

A typical stator of a conventional electric motor is shown in FIG. 6. In each of tooth sections 51, a winding-termination point of a motor coil 52 is located in a radially middle part of a slot 53, so a coil end is prone to be high. Since the winding-termination point is located in the middle part of the slot 53, the winding of the coil 52 is prone to be broken, by extending the cable for the next winding operation, so the cable cannot be level-wound and a lamination factor will be lowered.

In case of winding a thick cable on tooth sections 51 which have rectangular sections, the cable cannot be easily bent, so it is difficult to wind the thick cable. Further, a diameter of the winding must be increased, and gaps are easily formed in the winding section of the bobbin 54 and between layers of the cable. By forming the gaps, a lamination factor must be lowered.

SUMMARY

Accordingly, it is an object in one aspect of the invention to provide an electric motor capable of improving efficiency of level-winding coil cables and increasing lamination factors of coils.

To achieve the object, the electric motor of the present invention comprises:

a stator which includes:
    a ring-shaped stator core having tooth sections, which are radially extended;
    an insulator covering the tooth sections; and
    first and second coils being formed in slots between the adjacent tooth sections, the first and second coils being formed by winding wires on the insulator,
the insulator has first flange sections, each of which corresponds to a front end part of each of the tooth sections, second flange sections, each of which corresponds to an intermediate part of each of the tooth sections, and third flange sections, each of which corresponds to a base part of each of the tooth sections,
the insulator has first bobbins and second bobbins, a pair of the first bobbin and the second bobbin are axially formed on each of the tooth sections, each of the first bobbins is formed between the first flange section and the second flange section, each of the second bobbins is formed between the second flange section and the third flange section,
the insulator has notches formed on the output shaft side and the opposite side thereof, the notches are formed in each of the second flange sections and the third flange sections,
the insulator has groove sections, which are formed on the output shaft side and the opposite side, each of which is formed between the second flange section and the third flange section and which correspond to the tooth sections and extended in the axial directions thereof, each of the groove sections makes the notches of each pair of the second flange section and the third flange section communicate with the first bobbin, and
a coil cable, which is wound on the first bobbins as the first coils, has connection parts, the connection parts are respectively extended from a winding-start point of the first coil wound on each of the first bobbins and a winding-termination point thereof, for parallel winding, through the groove section located on the inner side of the second coil wound on each of the second bobbins so as not to interfere with the second coil.

Preferably, the connection part extended from the winding-start point of each of the first coils in the same phase is put through the groove section, and the coil cable is reciprocally level-wound on the first bobbin,
the connection part extended from the winding-termination point of each of the first coils in the same phase is put through the groove section and extended along an outer face of the third flange section as a transfer cable,
another coil cable, which is wound on the second bobbins as the second coils, has connection parts, the connection parts are respectively extended from a winding-start point of the second coil wound on each of the second bobbins and a winding-termination point thereof,
the connection part extended from the winding-start point of each of the second coils in the same phase is put through the notch of the third flange section, and another coil cable is reciprocally level-wound on the second bobbin,
the connection part extended from the winding-termination point of each of the second coils in the same phase is extended along the outer face of the third flange section as a transfer cable.

Preferably, the connection parts extended from the winding-start points and the winding-termination points of the first coils and the second coils are outwardly extended from the insulator on the opposite side of the output shaft side, and
the transfer cables, which connect the coils in the same phase, are extended along the outer faces of the third flange sections provided on the output shaft side.

Preferably, the transfer cables, which connect the coils in the same phase, are extended along the outer faces of the third flange sections provided on the output shaft side and those provided on the opposite side of the output shaft side alternately.

Preferably, the first coils wound on the first bobbins and the second coils wound on the second bobbins have elongated linear sections.

In the electric motor of the present invention, the connection parts are respectively extended from the winding-start point of the first coil wound on each of the first bobbins and the winding-termination point thereof, for parallel winding, through the groove section located on the inner side of the second coil wound on each of the second bobbins so as not to interfere with the second coil. Therefore, the coil cables can be separately wound on the first bobbins and the second bobbins with relatively large diameters, so that coil lengths can be longer than those of a conventional motor in which each coil is formed by lap-winding a coil cable on a tooth section, the coil cables can be level-wound with fixed diameters, and lamination factors of the coils can be improved. The coil cables can be separately wound on the first bobbins and the second bobbins, so that efficiency of winding cables can be improved. Further, the connection parts are extended through the groove sections, each of which is a dead space located on the inner side of the second coil, so that cable lengths can be effectively shortened.

In another example, the connection part extended from the winding-start point of each of the first coils in the same phase is put through the groove section, and the coil cable is reciprocally level-wound on the first bobbin, the connection part extended from the winding-termination point of each of the first coils in the same phase is put through the groove section and extended along the outer face of the third flange section as the transfer cable, another coil cable, which is wound on the second bobbins as the second coils, has connection parts, the connection parts are respectively extended from the winding-start point of the second coil wound on each of the second bobbins and the winding-termination point thereof, the connection part extended from the winding-start point of each of the second coils in the same phase is put through the notch of the third flange section, and another coil cable is reciprocally level-wound on the second bobbin, and the connection part extended from the winding-termination point of each of the second coils in the same phase is extended along the outer face of the third flange section as the transfer cable.

With this structure, the groove sections and the third flange sections of the insulator can be used as common spaces for extending the coil cables of the first coils and the second coils, and the outer faces of the third flange sections can be used as guides of the transfer cables. Therefore, cable lengths can be shortened, and the coil cables can be easily extended and wired.

In case that the connection parts extended from the winding-start points and the winding-termination points of the first coil and the second coil are outwardly extended from the insulator on the opposite side of the output shaft side and that the transfer cables, which connect the coils in the same phase, are extended along the outer faces of the third flange sections provided on the output shaft side, the winding-start points and the winding-termination points of the coils can be easily connected to the connection parts in large spaces.

In a further example, the transfer cables, which connect the coils in the same phase, are extended along the outer faces of the third flange sections provided on the output shaft side and those provided on the opposite side of the output shaft side alternately. With this structure, the transfer cables, which are connected to the winding-start points and the winding-termination points of the coils and extended through the notches of the third flange sections, are put through the groove sections located on the output shaft side and the opposite side thereof, so that spaces for wiring cables can be large and the coil cables can be easily extended and wired.

In case that the first coils wound on the first bobbins and the second coils wound on the second bobbins are wound to elongate the linear sections, the thick coil cables, whose diameter is 0.8 mm or more, can be wound, without forming coil deformations, by highly reducing curved sections, so that the coils can be easily level-wound with fixed diameters.

BRIEF DESCRIPTION OF THE DRAWINGS

Embodiments of the present invention will now be described by way of examples and with reference to the accompanying drawings, in which:

FIG. 5A is a sectional view taken along a line A-A of FIG. 4B;

FIG. 5B is a sectional view taken along a line B-B of FIG. 5A;

FIG. 5C is a sectional view taken along a line C-C of FIG. 5B;

FIG. 5D is a sectional view taken along a line D-D of FIG. 5B; and

DETAILED DESCRIPTION OF THE EMBODIMENTS

Figure 1:
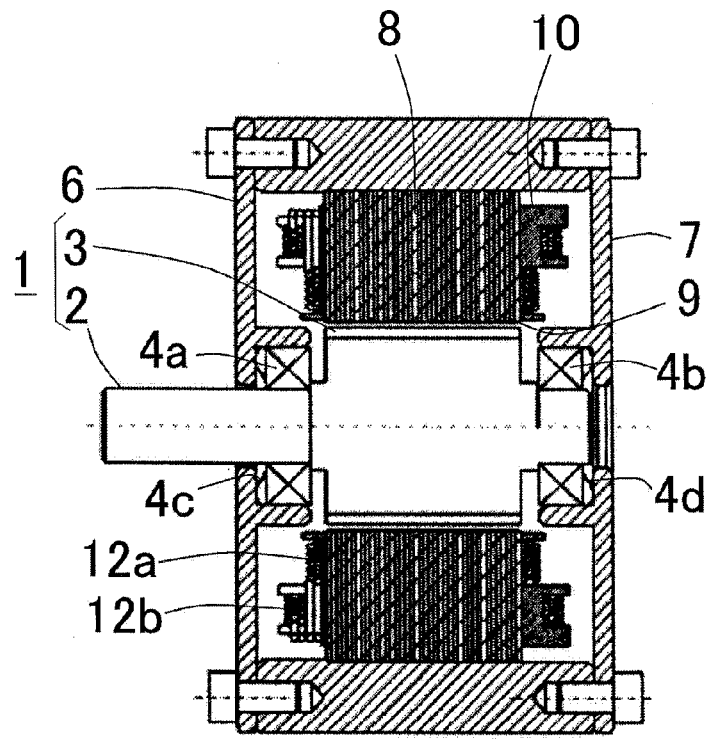
FIG. 1 is a sectional view of an electric motor of an embodiment of the present invention.

Preferred embodiments of the present invention will now be described in detail with reference to the accompanying drawings. Note that, an inner rotor type DC brushless motor, which is used in a vehicle, will be explained as an embodiment of the electric motor of the present invention.

A schematic structure of the electric motor will be explained with reference to FIGS. 1-3.

A rotor 1 is constituted by an output shaft 2 and a rotor magnet 3 integrated with the output shaft 2. The rotor magnet 3 is provided to a middle part of the output shaft 2, and both end parts of the output shaft 2 are rotatably held by bearing sections 4a and 4b, e.g., ball bearings.

A bearing retainer plate 6 is fixed to a front end (an end located on the output shaft side) of a cylindrical casing 5 by screws. On the other hand, a bearing retainer plate 7 is fixed to a rear end (an end located on the opposite side) of the casing 5 by screws. The bearing section 4a is attached, with a pressurization spring 4c, by proper means, e.g., press fit, thermal insert, adhesion. The bearing section 4b is also attached, with a pressurization spring 4d, by proper means, e.g., press fit, thermal insert, adhesion.

In FIG. 1, a ring-shaped stator core 8 is attached to an inner face of the casing 5, and a plurality of tooth sections (magnetic pole sections) 9 are inwardly projected from the stator core 8. The stator core 8 is covered with an insulator 10, and first coils 12a and second coils 12b (motor coils) are formed in slots 11 (see FIG. 2) between the adjacent tooth sections 9.

Figure 2:
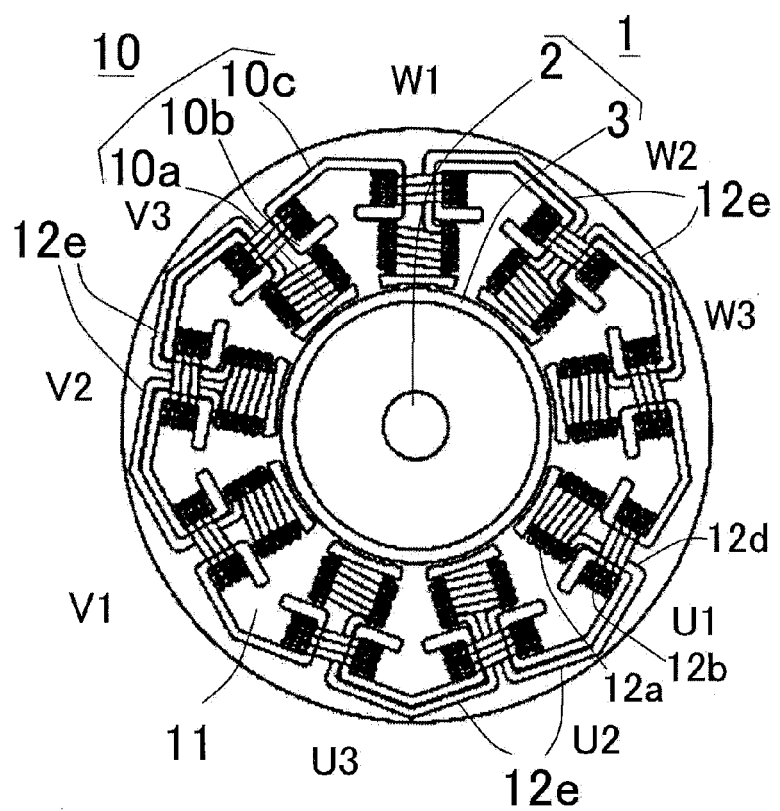
FIG. 2 is a front view of the electric motor, which shows an inner mechanism seen from the output shaft side.
Figure 3:
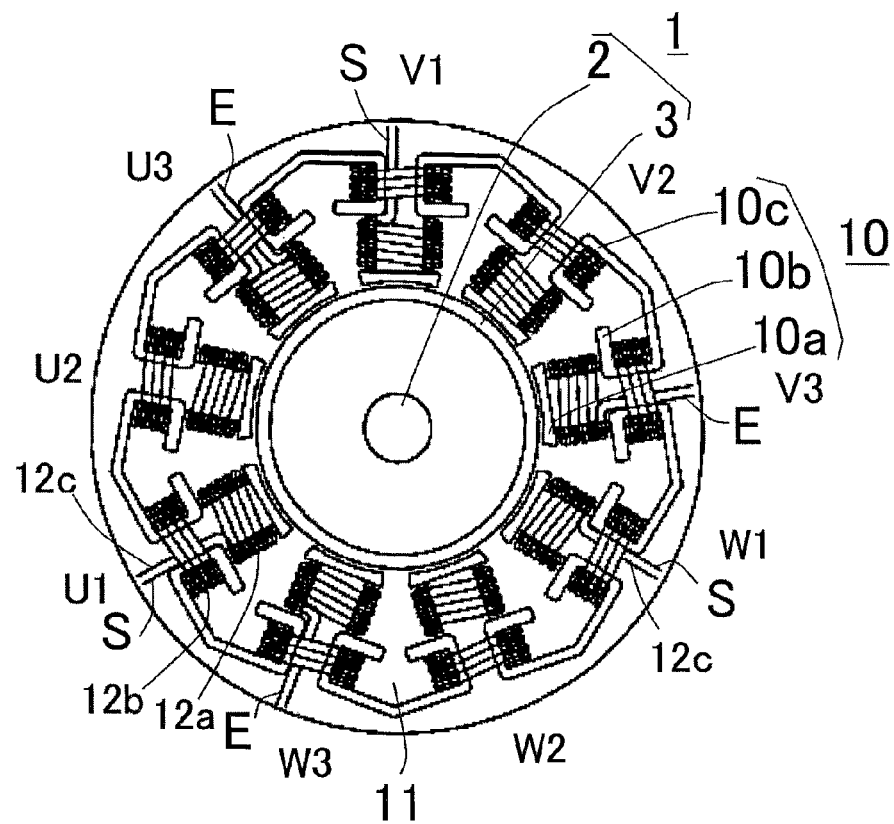
FIG. 3 is a rear view of the electric motor, which shows the inner mechanism seen from the other side.

For example, as shown in FIGS. 2 and 3, the stator core 8 has three phases, 10 magnetic poles and nine slots. The insulator 10, which covers the tooth sections 9, has first flange sections 10a, each of which corresponds to a front end part of each of the tooth sections 9, second flange sections 10b, each of which corresponds to an intermediate part of each of the tooth sections 9, and third flange sections 10c, each of which corresponds to a base part of each of the tooth sections 9.

Figure 4A:
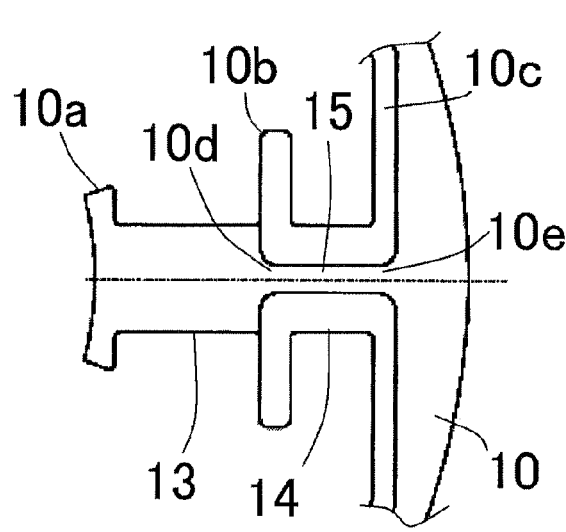
FIG. 4A is a fragmentary view of an insulator.

As shown in FIG. 4A, a first bobbin 13 is formed between the first flange section 10a and the second flange section 10b, and a second bobbin 14 is formed between the second flange section 10b and the third flange section 10c. The bobbins 13 and 14 are contiguously formed.

In FIG. 4A, the insulator 10 has notches 10e and 10e, which are formed on the output shaft side of the insulator and the opposite side thereof, and the notches 10d and 10e are formed in each of the second flange sections 10b and the third flange sections 10c. The insulator 10 has groove sections 15, which are formed on the output shaft side of the insulator and the opposite side thereof, each of which is formed between the second flange section 10b and the third flange section 10c and which correspond to the tooth sections 9 and extended in the axial directions of the tooth sections 9. Each of the groove sections 15 makes the notches 10d and 10e of each pair of the second flange section 10b and the third flange section 10c communicate with the first bobbin 13.

Figure 4B:
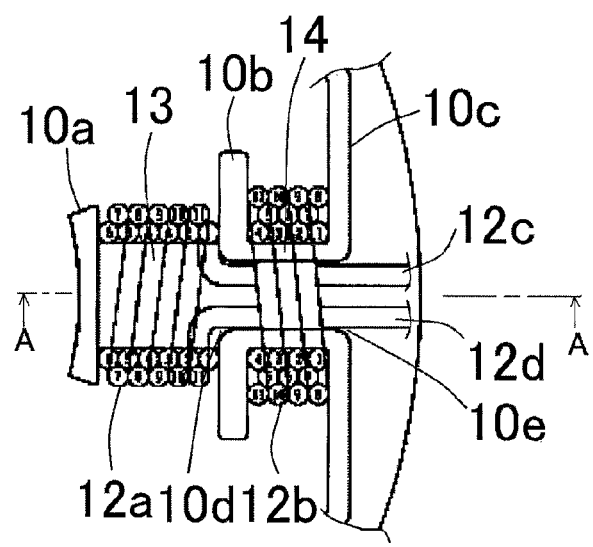
FIG. 4B is a fragmentary view of the insulator on which coils are wound.
Figure 6:
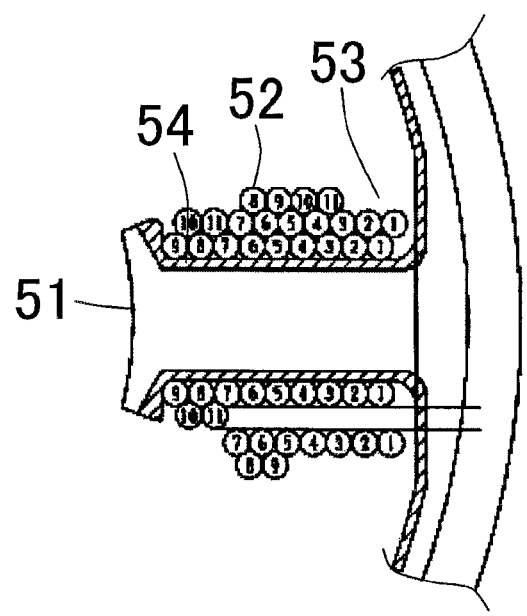
FIG. 6 is a partial sectional view of the lap-wound motor coil of the conventional electric motor.

As shown in FIG. 4B, a coil cable, which is wound on the first bobbins 1 as the first coil 12a, has connection parts 12c and 12d. The connection parts 12c and 12d are respectively extended from a winding-start point S of the first coil 13 and a winding-termination point E thereof, for parallel winding, through the groove section 15. The connection parts 12c and 12d are passed under the second coil 12b, which is wound on the second bobbin 14, without occurring interference with the second coil 12b.

Therefore, the coil cables can be separately wound on the first bobbins 13 and the second bobbins 14 with relatively large diameters, so that coil lengths of the coils 12a and 12b can be longer than those of the conventional motor in which each coil is formed by lap-winding coil cables on the tooth section, the coil cables can be level-wound with fixed diameters, and lamination factors of the coils 12a and 12b can be improved. The coil cables can be separately wound on the first bobbins 13 and the second bobbins 14, so that efficiency of winding cables can be improved.

Further, the connection parts 12c and 12d, which are respectively extended from the winding-start point S and the winding-termination point E of the first coil 12a formed on the first bobbin 13 as shown in FIG. 3, are extended through the groove section 15, which is a dead space located on the inner side of the second coil 12b, so that a cable length of the first coil 12a can be effectively shortened and the cable can be efficiently wired.

As shown in FIG. 3, the stator has three phases, e.g., U1-3 phase, V1-3 phase and W1-3 phase. The connection part 12c extended from the winding-start point S of each of the first coils 12a in the same phase is put through the groove section 15, and the coil cable is reciprocally level-wound on the first bobbin 13. Further, as shown in FIG. 2, the connection part 12d extended from the winding-termination point E of each of the first coils 12a in the same phase is put through the groove section 15 and extended along an outer face of the third flange section 10c as a transfer cable 12e.

In FIG. 3, the connection part 12c extended from the winding-start point S of each of the second coils 12b in the same phase (the U1-3 phase, V1-3 phase or W1-3 phase) is put through the notch 10e of the third flange section 10c, and the coil cable is reciprocally level-wound on the second bobbin 14. Further, as shown in FIG. 2, the connection part 12d extended from the winding-termination point E of each of the second coils 12b in the same phase is extended along the outer face of the third flange section 10c as a transfer cable 12e. In FIGS. 2 and 3, only the connection parts 12c and 12d, which are extended from the first bobbins 13, are shown. However, other connection parts (not shown) are extended, from the second bobbins 14, and wired as well as the connection parts 12c and 12d. Note that, heights of the connection parts extended from the second bobbin 14 are different from those of the connection parts 12c and 12d.

In the present embodiment, as shown in FIG. 3, the connection parts 12c and 12d extended from the winding-start points S and the winding-termination points E of the first coils 12a and the second coils 12b are outwardly extended from the insulator 10 on the opposite side of the output shaft side. Further, the transfer cables 12e, which connect the coils in the same phase, are extended along the outer faces of the third flange sections 10c provided on the output shaft side. With this structure, the winding-start points S and the winding-termination points E of the coils 12a and 12b can be easily connected to the connection parts in large spaces.

In FIG. 5C, the transfer cables 12e, which connect the coils in the same phase, may be extended along the outer faces of the third flange sections 10c provided on the output shaft side of the insulator 10 and those 10c provided on the opposite side of the output shaft side alternately. In this case, the transfer cables 12e, which are connected to the winding-start points S and the winding-termination points E of the coils 12a and 12b and extended through the notches 10e of the third flange sections 10c, are put through the groove sections 15 located on the axially output shaft side and the opposite side of the output shaft side, so that spaces for wiring cables can be large and the coil cables can be easily extended and wired.

In FIG. 5A, a coil diameter of a second winding section 14a of the second bobbin 14 is larger than that of a first winding section 13b of the first bobbin 13.

In FIG. 5B, the connection part 12c is connected to the winding-start point S of the coil on the first bobbin 13 via the groove section 15 and the notch 10d of the second flange section 10b. A first layer of the coil cable is wound from a part close to the second flange section 10b to the first flange section 10a. Next, a second layer of the coil cable is wound from the first flange section 10a to the second flange section 10b. Further, the connection part 12d connected to the winding-termination point E is guided by the second flange section 10b and outwardly extended via the notch 10d, the groove section 15 and the notch 10e of the third flange section 10c. The transfer cable 12e connected to the winding-termination point E is wired along the outer face of the third flange section 10c, which acts as a guide, as shown in FIG. 3.

The connection part 12c is connected to the winding-start point S of the coil on the second bobbin 14 via the notch 10e of the third flange section 10c. A first layer of the coil cable is wound from a part close to the third flange section 10c to the second flange section 10b. Next, a second layer of the coil cable is wound from the second flange section 10b to the third flange section 10c, and a third layer of the coil cable is wound from the third flange section 10c to the second flange section 10b. Further, the connection part 12d connected to the winding-termination point E is outwardly extended via the notch 10d, the groove section 15 and the notch 10e of the third flange section 10c. The transfer cable 12e connected to the winding-termination point E is wired along the outer face of the third flange section 10c, which acts as a guide, as shown in FIG. 3.

Further, as shown in FIG. 5C, the second coil 12b, which is wound on the second bobbin 14, has elongated linear sections 12f, so it is formed like an athletics track field. Ends of the linear sections 12f are connected by curved sections 12g.

In FIG. 5D, the first coil 12a, which is wound on the first bobbin 13, is constituted by elongated linear sections 12f except corners. With this structure, the thick coil cables, whose diameter is 0.8 mm or more, can be wound, without forming coil deformations, by highly reducing the curved sections 12g, so that the coils can be easily level-wound with fixed diameters.

In the above described embodiments, the electric motor is the inner rotor type DC brushless motor, but the present invention is not limited to the embodiments. For example, the present invention can be applied to outer rotor type DC brushless motors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention has been described in detail, it should be understood that the various changes, substitutions, and alternations could be made hereto without departing from the spirit and scope of the invention.

What is claimed is:

1. An electric motor comprising a stator,
    wherein the stator includes:
        a ring-shaped stator core having tooth sections, which are radially extended;
        an insulator covering the tooth sections; and
        first and second coils being formed in slots between the adjacent tooth sections, the first and second coils being formed on the insulator,
    the insulator has first flange sections, each of which corresponds to a front end part of each of the tooth sections, second flange sections, each of which corresponds to an intermediate part of each of the tooth sections, and third flange sections, each of which corresponds to a base part of each of the tooth sections,
    the insulator has first bobbins and second bobbins, a pair of the first bobbin and the second bobbin are axially formed on each of the tooth sections, each of the first bobbins is formed between the first flange section and the second flange section, each of the second bobbins is formed between the second flange section and the third flange section,
    the insulator has notches formed on the output shaft side and the opposite side thereof, the notches are formed in each of the second flange sections and the third flange sections,
    the insulator has groove sections, which are formed on the output shaft side and the opposite side, each of which is formed between the second flange section and the third flange section and which correspond to the tooth sections and extended in the axial directions thereof, each of the groove sections makes the notches of each pair of the second flange section and the third flange section communicate with the first bobbin, and
a coil cable, which is wound on the first bobbins as the first coils, has connection parts, the connection parts are respectively extended from a winding-start point of the first coil wound on each of the first bobbins and a winding-termination point thereof, for parallel winding, through the groove section located on the inner side of the second coil wound on each of the second bobbins so as not to interfere with the second coil.

2. The electric motor according to claim 1,
    wherein the connection part extended from the winding-start point of each of the first coils in the same phase is put through the groove section, and the coil cable is reciprocally level-wound on the first bobbin,
    the connection part extended from the winding-termination point of each of the first coils in the same phase is put through the groove section and extended along an outer face of the third flange section as a transfer cable,
    another coil cable, which is wound on the second bobbins as the second coils, has connection parts, the connection parts are respectively extended from a winding-start point of the second coil wound on each of the second bobbins and a winding-termination point thereof,
    the connection part extended from the winding-start point of each of the second coils in the same phase is put through the notch of the third flange section, and another coil cable is reciprocally level-wound on the second bobbin, and
    the connection part extended from the winding-termination point of each of the second coils in the same phase is extended along the outer face of the third flange section as a transfer cable.

3. The electric motor according to claim 1,
    wherein the connection parts extended from the winding-start points and the winding-termination points of the first coils and the second coils are outwardly extended from the insulator on the opposite side of the output shaft side, and
    the transfer cables, which connect the coils in the same phase, are extended along the outer faces of the third flange sections provided on the output shaft side.

4. The electric motor according to claim 1,
    wherein the transfer cables, which connect the coils in the same phase, are extended along the outer faces of the third flange sections provided on the output shaft side and those provided on the opposite side of the output shaft side alternately.

5. The electric motor according to claim 1,
    wherein the first coils wound on the first bobbins and the second coils wound on the second bobbins have elongated linear sections.

\* \* \* \* \*